Nov. 9, 1965 E. D. MORROW ETAL 3,216,743
BUSINESS FORMS FOR USE IN TIME-AND-AMOUNT-CONTROLLED
CREDIT TRANSACTIONS
Filed Dec. 18, 1962 2 Sheets-Sheet 1

INVENTORS.
EUGENE D. MORROW,
JAMES E. MALOCH,
BY
Arant & Maltby
ATTORNEYS.

Nov. 9, 1965 E. D. MORROW ETAL 3,216,743
BUSINESS FORMS FOR USE IN TIME-AND-AMOUNT-CONTROLLED
CREDIT TRANSACTIONS
Filed Dec. 18, 1962 2 Sheets-Sheet 2
INVENTORS.
EUGENE D. MORROW,
JAMES E. MALOCH,
BY
Arant & Maltby
ATTORNEYS.

United States Patent Office 3,216,743
Patented Nov. 9, 1965

3,216,743
BUSINESS FORMS FOR USE IN TIME-AND-AMOUNT-CONTROLLED CREDIT TRANSACTIONS
Eugene D. Morrow, P.O. Box 2332, Palos Verdes Peninsula, Calif., and James E. Maloch, 622 E. Herring, West Covina, Calif.
Filed Dec. 18, 1962, Ser. No. 245,458
5 Claims. (Cl. 283—66)

The present invention is an improvement over that disclosed and claimed in our co-pending application Serial No. 116,015 filed June 9, 1961, now abandoned.

Our application entitled "Method of Computer Processing of Periodically Issued Credit Documents" has been filed concurrently herewith, Serial No. 245,459, filed December 18, 1962. That application describes a method wherein the periodic processing cycle for credit authorization documents, and the periodic processing cycle for statement documents, are synchronized so that both sets of documents are processed through the same computer at the same time. The advantages of the process are particularly described with reference to a credit card system which makes provision for third-partly verification of the dollar amount of credit authorization, in addition to verifying the identity of the credit user and the current status of his credit commitment authorization. The present application discloses and claims a particular embodiment of business forms which are especially adapted for use in that type of credit card system.

In defining the present invention the term "credit" is not intended to imply an absence of cash or money from the business transactions, but simply indicates in a broad sense the usage of credit documents, drafts, or negotiable instruments as an essential part of each transaction. This broad usage of the term "credit" is clearly outlined in our companion application Serial No. 245,459, referred to above.

It is therefore the principal purpose and objective of this invention to provide a novel business form for use in the periodic issuance of credit to individuals and useable in a plurality of purchase transactions extending over and through a successive time period.

A more particular object of the invention is to provide a business form which includes portions to indicate credit dollar amount limits and also a statement portion having a payment stub to facilitate the making of payments covering exercise of the credit during a previous time period.

An additional object of the invention is to provide an improved business form as in the preceding objects wherein the form has a plurality of authenticating vouchers that are separably detachable from the form and useable for the making of several credit purchases.

A further object of the invention is to provide a continuous business form as in the previous objects that is so constituted as to be fed to the output or printing mechanism of a computing machine.

The objects and advantages of the invention will be more readily appreciated by considering the following detailed description in conjunction with the accompanying drawings, wherein:

FIGURE 1 illustrates a blank continuous business form, which may be utilized in carrying out the method of the present invention, each separate section of which is a composite monthly report form;

FIGURE 1a illustrates the credit authorization portion of a composite monthly report for a particular month after it is issued and being used;

FIGURE 1b shows the entire composite monthly report filled out for use in the next monthly issuance of credit;

FIGURE 2 illustrates a blank purchase check form;

FIGURE 2a illustrates the purchase check form of FIGURE 2 after it has been filled out and authenticated by attachment of vouchers thereto; and FIGURE 2b is a fragmentary cross-sectional view of the authenticated purchase check of FIGURE 2a.

Reference is now made to FIGURES 1, 1a, and 1b of the drawings, illustrating a preferred embodiment of the composite monthly report form 10. As will be seen from these figures the statement portion 12 and credit authorization portion 11 are detachably secured to each other along a perforated line, while the statement section 12a and payment stub 12b are similarly detachable from each other. The dollar amount control section 11b includes a plurality of separate vouchers 37 arranged in rows and columns and detachable from each other along perforated lines.

FIGURE 1 illustrates the blank composite monthly report form as it appears prior to being fed into the computing machine. The complete business form in fact includes a plurality of separate form sections 10, which are arranged in a serial configuration and detachable from each other along perforated lines. The complete form also includes longitudinal marginal portions 30a and 30b which are adapted to provide the driving surfaces for the form in passing through the output mechanism of the computer, and to ensure the vertical and horizontal registration of the form, all in a manner which is entirely conventional.

FIGURE 1a illustrates the manner in which the credit authorization portion 11 of the monthly report form 10 is filled out. The monthly identification card 11a is entirely conventional in its arrangement, and carries the name of the institution which has issued or approved the issuance of the credit card (The General Stores), as well as the name (John and Mary Doe) and account number (98765) of the particular credit customer to whom the card is issued. The card 11a also carries an expiration date (July 31, 1961) which in the particular example is the last day of the calendar month for which the card was issued. In the dollar amount control section 11b each of the vouchers 37 has appropriate spaces in which the computer has printed a dollar amount ($15.00), the account number (98765) of the customer, and the month during which the associated credit card 11a is valid (7, indicating July). FIGURE 1a shows two of the vouchers 37 having been detached, the manner of use thereof after detachment being explained subsequently.

The preferred practice in using the credit authorization portion 11 of the form 10 is to fold the voucher section beneath the identification card section so as to provide a convenient wallet-sized package. In normal usage the cardholder makes several purchases during the month and, in conjunction with each purchase, surrenders vouchers whose total dollar amount is at least equal to the dollar amount of the purchase.

FIGURE 1b illustrates the typical form of the composite monthly report as it is issued for the succeeding month. Purchases in the amount of $46.12 have been made during the previous month and are accordingly shown on the statement section 12a. A payment in the amount of $10.00 has been made and is also indicated on the statement section. The statement section also shows the balance due on the account, $196.00, which is likewise shown on the payment stub 12b.

The dollar amount of credit issued for July to the particular customer John and Mary Doe as shown in FIGURE 1a was $300.00 (20 vouchers having a face value of $15.00 each). Due to purchases made during July which substantially exceeded the payment, the amount of credit issued at the commencement of the month of August is diminished. Thus in FIGURE 1b the dollar amounts of the vouchers are $5.00 and the total credit authorization is only $100.

FIGURE 2 illustrates a blank purchase check form 35 which may be utilized in carrying out the present invention. It will of course be understood that any type of purchase check or sales slip may be used as desired by the establishment with which the credit customer John Doe happens to be dealing. Suffice to say that the purchase check, of whatever configuration, generally carries spaces for entering the purchase, including the name of the institution where the purchase was made, the date and amount of the purchase, the name and account number of the credit card customer making the purchase, and a description of the goods purchased. In the particular example shown the purchase has been made at the store which issued the credit card; but it will be understood that in the general case the card is issued by a financial institution and purchases made at various stores. The significant innovation in accordance with the present invention is that not only does the store clerk verify the credit card number of the customer, and the fact that the card is still within its time period of validity, but the store clerk is also instructed to require the surrender of evidence of a dollar amount of credit authorization sufficient to cover the purchase. Thus FIGURE 2a illustrates the purchase check after it has been filled out and authenticated by attachment of vouchers 37 thereto. It will be seen that the actual amount of the purchase is $20.77 and this has been amount of the purchase. A special place is provided on face value of $15.00 or a total value of $30.00 which is greater than the actual authenticated by attaching two vouchers each having a purchase check form 35 for attachment of vouchers 37 thereto.

In order to facilitate the selective detachment of vouchers 37 from the credit authorization portion 11 of the monthly report form 10, and their attachment to a purchase check, the vouchers are provided with a gummed backing 37a. A protective covering 37b is placed on the reverse side of the gummed backing in order to prevent the same from sticking to any object prior to normal usage. In actual practice it is preferred to cover the undersurface of the entire business form with the gummed backing, and also with the protective covering 37b, which is preferably a thin sheet of silicone material. While this arrangement is generally illustrated in FIGURE 1a in conjunction with two of the vouchers 37 which have been detached, it is to be understood that the gummed backing 37a which is there shown as retained by the protective covering 37b is, in actual fact, retained on the voucher 37 and does not stick to the protective covering 37b.

It will be noted that the identification card 11a and the voucher section 11b are of substantially identical size, which facilitates folding the vouchers beneath the identification card for purpose of carrying the same in the wallet or check book of the user.

The structural arrangement of the authenticated purchase check is illustrated in FIGURE 2b' It will be seen that the thickness of the voucher 37 is preferably substantially less than the thickness of the purchase check form 35, which makes the documents easier to handle from a mechanical point of view. The authenticated purchase check is adapted to be fed back into the computer to provide input information thereto, it being understood that with suitable input equipment associated with the computer it is possible to read directly from the purchase check the information carried on the vouchers 37 which authenticate the purchase.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

We claim:

1. A business form for the multiple purpose of providing credit identification, insuring credit capability, rendering an account and providing means for payment of said account, said form comprising a single sheet having a first section including an identification portion thereof provided with means for identifying the creditor and the period for which his credit is valid and a credit authorization portion, said credit authorization portion of predetermined size comprising a fixed number of detachable credit vouchers, each having a space for specifying an individual amount of available credit and each provided with account identifying means, the total of said individual amounts being variable in accordance with the total amount of credit allotted to the account holder during said period, said credit authorization portion being integrally connected to said identification portion along a fold line and being foldable against the rear face thereof, said credit vouchers being separably interconnected along lines of separation and having adhesive means applied on the rear surface thereof, and a second section separably connected to said first section, said second section comprising a statement portion for presenting a current balance statement for the account holder and also comprising a separable stub payment portion detachably secured thereto.

2. A business form as defined in claim 1 wherein a pressure-sensitive adhesive means is provided on the undersurface of said credit authorization portion.

3. A business form as provided in claim 2 wherein said pressure-sensitive adhesive is provided with a protective backing sheet.

4. A business form as described in claim 1 wherein said single sheet is provided along opposite edges thereof with means for detachably securing the same to similar sheets to facilitate computer processing.

5. A business form as defined in claim 1 wherein said credit authorization portion is equal in size to said identification portion.

References Cited by the Examiner

UNITED STATES PATENTS

| 832,796 | 10/06 | Kimber | 283—7 X |
| 1,329,120 | 1/20 | Gesell | 283—59 |
| 1,760,417 | 5/30 | Lake | 281—43 |
| 2,568,427 | 9/51 | Wolowitz | 283—7 X |
| 2,700,556 | 1/55 | Holmwood | 282—11.5 X |

OTHER REFERENCES

A. M. Strong disclosure, April 14, 1960, 1 sheet.

JEROME SCHNALL, *Primary Examiner.*

LAWRENCE CHARLES, *Examiner.*